United States Patent [19]

Cornelius

[11] 4,296,643
[45] Oct. 27, 1981

[54] MOTORCYCLE THROTTLE GRIPPER

[76] Inventor: Morris E. Cornelius, Box 91, Yale, Iowa 50277

[21] Appl. No.: 66,429

[22] Filed: Aug. 13, 1979

[51] Int. Cl.³ .............................................. G05G 5/16
[52] U.S. Cl. ................................ 74/531; 24/248 SA; 24/252 A; 74/488; 188/75; 188/83; 192/3 T
[58] Field of Search .......................... 74/531, 488, 489; 192/3 T; 188/75, 83; 24/248 SA, 252 A

[56] References Cited

U.S. PATENT DOCUMENTS

| | | | |
|---|---|---|---|
| 1,184,942 | 5/1916 | Gardner | 188/83 |
| 1,481,669 | 1/1924 | Justice | 188/83 X |
| 1,965,406 | 7/1934 | Caldwell et al. | 188/83 X |
| 2,862,582 | 12/1958 | Rose et al. | 188/83 X |
| 3,982,446 | 9/1976 | Van Dyken | 74/531 X |
| 4,060,008 | 11/1977 | Wilkinson | 192/3 T X |
| 4,137,793 | 2/1979 | Sowell | 74/531 X |

Primary Examiner—Allan D. Herrmann

[57] ABSTRACT

A motorcycle throttle gripper having two friction levers with one friction lever positioned below the throttle grip hand control and closely mounted brake lever hand control and with one friction lever positioned above the throttle grip hand control and closely mounted brake lever hand control. On each of the two friction levers a rounded concave offset section seats on and grips the throttle grip hand control roughly similar to an external brake band or segment of a brake band around a brake drum or wheel. Also, on each of the two friction levers a straight section is mounted in sliding contact with the forward brake lever hand control. On the three embodiments of the invention the upper and lower friction levers are held in friction contact to the throttle grip hand control and the brake lever hand control by means of tension producing rubber bands, elastic members, or by means of tension producing springs, bolts, and self locking nuts. The combination of the direct rotational friction contact with the throttle grip hand control and the direct sliding friction contact with the brake lever hand control results in a lever system which provides efficient near zero backlash for the operation of the invention. This means that even a slight change in the rotational throttle grip hand control speed setting will be held at that setting by the efficient two friction levers in the system of the invention.

3 Claims, 3 Drawing Figures

MOTORCYCLE THROTTLE GRIPPER

BACKGROUND

In a motorcycle throttle gripper several devices are in use which are intended to prevent the right hand wrist and arm of the motorcycle rider from becoming fatigued on long trips due to the necessity of having to exert constant twisting effort on the throttle grip hand control due to the carburetor spring used on all modern motorcycles which is intended to cause the throttle grip hand control to return to the closed throttle position if for any reason the throttle grip hand control is released by the motorcycle rider.

One throttle grip hand control fatigue reducing device which is in use is an added elongated throttle grip spring which is mounted internally in the handlebar and throttle grip hand control assembly and it is mounted so as to counteract the carburetor spring tension which requires the rotational effort normally required to open the throttle up and maintain the cycle riding throttle grip hand control setting. This device which is intended to reduce wrist and arm fatigue doesn't hold a throttle grip speed setting by a friction means of any kind. It merely counteracts the carburetor spring tension that causes throttle grip hand control rotational effort to be present on all modern motorcycles. This device doesn't hold a throttle grip hand control setting by any friction device.

Another throttle grip hand control fatigue reducing device which is in use is a thumb lever which is securely attached to the throttle grip hand control which can be pushed on by the right hand thumb to assist with holding the throttle in the open position for the cycle riding throttle grip hand control setting. However, this device requires constant thumb pressure.

Another throttle grip hand control fatigue reducing device which is in use is a rotational friction producing device which is secured to the throttle grip hand control and then an attaching arm is secured to the right hand portion of the handlebar of the cycle. When a small lever on the right hand side by the handlebar is manipulated by the fingers of the right hand or by the fingers of the left hand the throttle setting friction action can be applied or it can be released. With this device it is necessary to manipulate the small lever on the right hand side of the handlebar with the fingers of the right or left hand which can cause either inconvenience, distraction or dangerous one hand riding with only one hand on the handlebars and this can cause front wheel wobbling due to the unbalanced weight of only one hand on the handlebars on only one side of the handlebars. Also, the device described above is much more mechanically complex and is therefore more costly. Also, since one arm of the above device must be mounted to the right hand portion of the handlebars, it does require mounting space on the handlebar that is needed for mounting the right hand rear view mirror to the right hand handlebar area.

Another throttle grip hand control fatigue reducing device which is in use is a single lever with one end bent into a circular shape intended to fit snugly around the throttle grip hand control and with the opposite or forward end of the lever being positioned above the brake lever hand control. Then when the throttle grip hand control is rotated counter-clockwise to open the throttle the lever raises upward from the brake lever hand control. Then the front end of the single lever must be pushed down to contact the brake lever hand control with the left hand of the cycle rider. Therefore, this device requires the cycle rider to ride with only one hand on the throttle grip hand control which can result in dangerous front wheel wobbling due to the unbalanced weight of only one hand on the handlebars on only one side of the handlebars. Also, when riding the motorcycle on hilly areas the throttle grip engine speed setting is constantly being changed as you ride up the hills and then down the hills before reaching leveler ground. This means that with this device the motorcycle rider would need to be constantly pushing the forward portion of the single lever downward against the brake lever hand control by the fingers of the right hand or by the fingers of the left hand which would mean a lot of dangerous reaching around at higher road speeds.

Another throttle grip fatigue reducing device somewhat similar in operation to the device described in the preceding paragraph consists of a nut cracker type device with two levers hingedly connected at one end. The hingedly connected end faces rearwardly on the throttle grip hand control with the two levers clamping onto the throttle grip and with the opposite forward ends of the levers facing forward and with the two forward ends of the two levers being positioned above the brake lever hand control. An elastic band is stretched around the forward ends of the two levers with both levers positioned above the brake lever hand control. Then when the throttle grip hand control is rotated counter-clockwise to open the throttle the two levers raise upward from the brake lever hand control. Then the front end of the two levers must be pushed down to contact the brake lever hand control with the left hand of the cycle rider. Therefore, this device requires the cycle rider to ride with only one hand on the throttle grip hand control which can result in dangerous front wheel wobbling due to the unbalanced weight of only one hand on the handlebars on only one side of the handlebars. Also, when riding the motorcycle on hilly areas the throttle grip engine speed setting is constantly being changed as you ride up the hills and then down the hills before reaching leveler ground. This means that with this device the motorcycle rider would need to be constantly pushing the forward portion of the two levers positioned above the brake lever hand control downward against the brake lever hand control by the fingers of the right hand or by the fingers of the left hand which would mean a lot of dangerous reaching around at higher road speeds.

SUMMARY OF THE INVENTION

The "Motorcycle Throttle Gripper" of the present invention includes an upper and lower friction producing lever with one friction lever positioned above the throttle grip hand control and brake lever hand control and with one friction lever positioned below the throttle grip hand control and brake lever hand control. The two friction levers provide a slight frictional resistance to the rotation of the throttle grip hand control and also the same two friction levers provide a slight friction resistance to the sliding of the brake lever hand control. The slight sliding contact of the two friction levers of the invention provide a sliding frictional contact with the brake lever hand control which at the same time prevents the two levers from rotating with the rotational throttle. Therefore, in actual operation the "Motorcycle Throttle Gripper" provides efficient nearly zero backlash or free play for any given throttle setting. This means that even a slight change in the rotational throttle grip speed setting will be held at that setting by the efficient two levers in the system of the invention. This fact is great value for the "Motorcycle Throttle Gripper." Also, the "Motorcycle Throttle Gripper" of the invention requires no reaching around with either hand which means that the motorcycle rider can ride with both hands on the handlebars at all times for improved safety.

In the three embodiments of the invention the upper and lower friction levers are operably connected by either elastic members, by bolts with a spring and self locking nuts, or by a single bolt, a spring and self locking nut for the springy type of upper and lower friction levers.

Each of the two friction levers in the first embodiment of the invention utilizes a separate elastic member or rubber bands fixedly connected to the extreme front and rear ends of the two friction producing levers to maintain efficient rotational friction contact by the offset concave portions of the two friction levers onto the throttle grip hand control and efficient sliding frictional contact by the straight portions of the two friction levers onto the forward brake lever.

On each of the two friction levers a second embodiment of the invention utilizes a different tension producing means consisting of a separate bolt, spring, and self-locking nut fixedly interconnecting the upper and lower friction levers at a point just rearward of the rearward offset concave portion of the friction levers to provide efficient rotational frictional contact on the throttle grip hand control and a separate tension producing means consisting of a separate bolt, spring, and self-locking nut fixedly interconnecting the upper and lower friction levers at a point just forward of the forward brake lever hand control position to provide efficient sliding frictional contact on the brake lever and control.

On each of the two friction levers a third embodiment of the invention utilizes springy upper and lower friction levers which are fixedly connected by a bolt, spring, and self-locking nut at a point forward of the rearward friction producing offset concave portion of the friction levers with the said bolt, spring, and self-locking nut located rearward of the forward brake lever position. Mounted in this manner the springy upper and lower friction levers maintain rotational friction contact by the offset concave portions of the two friction levers onto the throttle grip and sliding frictional contact by the slightly curved portions of the two friction levers onto the forward brake lever.

BRIEF DESCRIPTION OF THE DRAWINGS

These and other features and advantages of the present invention will be appreciated as the same becomes better understood by reference to the following drawings.

DESCRIPTION

Figure 1:
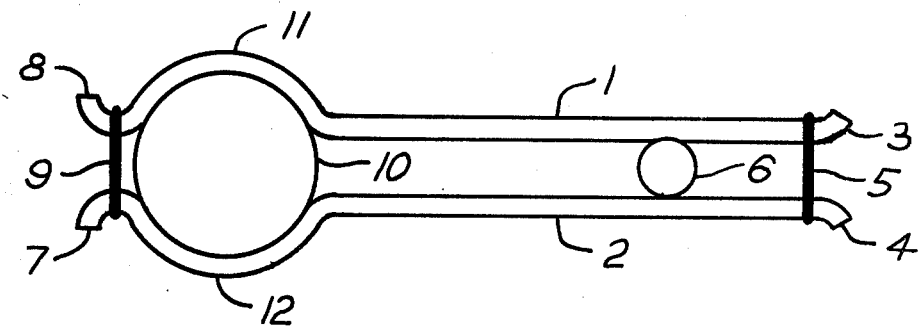
FIG. 1 is an axial elevation view showing the first embodiment of the invention.

Referring now to the drawings, in FIG. 1 there is shown an axial elevation view of the first embodiment of the invention. The "Motorcycle Throttle Gripper" includes an upper friction lever 1 and a lower friction lever 2. These friction levers 1,2 are made of a durable material such as steel or aluminum for example. At the slightly bent extremities 3,4 at the right hand end of the friction lever 1 and friction lever 2 is an elastic member 5 which causes the brake lever hand control 6 to be in efficient frictional sliding contact with the upper friction lever 1 and the lower friction lever 2. At the slightly bent extremities 7,8 at the left hand end of the friction lever 1 and friction lever 2 is an elastic member 9 which causes the rotational throttle hand control 10 to be in efficient frictional rotational contact with the upper friction lever 1 and the lower friction lever 2. When the throttle hand control 10 is rotated it is in efficient rotational contact with the offset concave portions 11,12 of the friction levers 1,2 to provide efficient rotational frictional contact onto the throttle grip hand control 10. When the brake lever hand control 6 is actuated by hand then the straight portion of the friction levers 1,2 are in efficient sliding frictional contact with the brake lever hand control 6. This embodiment of the invention provides a "Motorcycle Throttle Gripper" which has very close to zero backlash. This means that even a very slight rotational movement of the throttle hand control 10 will be maintained automatically at the new throttle hand control 10 setting by the efficient offset concave portions 11,12 acting in efficient rotational frictional contact to hold the throttle hand control 10 setting selected. This embodiment of the system of the invention is efficient because the elastic members 5,9 are free to contract slightly or to stretch slightly when surface irregularities are present either on the rubber throttle hand control 10 or on the brake lever hand control 6. If any surface irregularities are present on the rubber throttle hand control 10 or on the brake lever hand control 6 then the elastic members 5,9 simply contract slightly or stretch slightly while maintaining efficient frictional contact.

Figure 2:
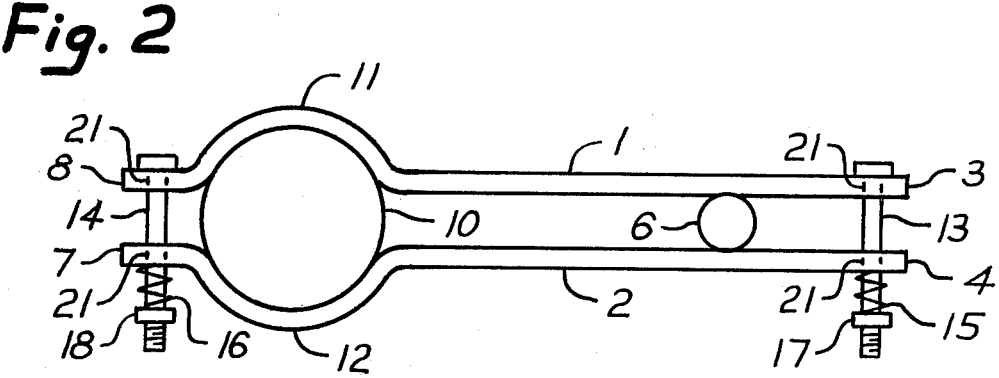
FIG. 2 is an axial elevation view showing the second embodiment of the invention.

Referring now to the drawings in FIG. 2 there is shown an axial elevation view of the second embodiment of the invention. The "Motorcycle Throttle Gripper" includes an upper friction lever 1 and a lower friction lever 2. These friction levers 1,2 are made of a durable material such as steel or aluminum for example. At the right hand extremities 3,4 of the friction lever 1 and the friction lever 2 are holes 21,21 which receives bolt 13 with a spring 15 and self locking nut 17 which cause the brake lever hand control 6 to be in efficient frictional sliding contact with the upper friction lever 1 and the lower friction lever 2. At the left hand extremities 7,8 at the left hand end of the friction lever 1 and friction lever 2 are holes 21,21 which receives bolt 14 with a spring 16 and self-locking nut 18 which causes the rotational throttle hand control 10 to be in efficient rotational contact with the upper friction lever 1 and the lower friction lever 2. When the throttle hand control 10 is rotated, it is in efficient rotational friction contact with the offset concave portions 11,12 of the friction levers 1,2 to provide efficient rotational frictional contact onto the throttle grip hand control 10. When the brake lever hand control 6 is actuated by hand then the straight portion of the friction levers 1,2 are in efficient frictional contact with the brake lever hand control 6. This embodiment of the invention also provides a "Motorcycle Throttle Gripper" which has very close to zero backlash. This means that even a very slight rotational movement of the throttle grip hand control 10 will be maintained automatically at the new throttle hand control 10 setting by the efficient offset concave portions 11,12 acting in efficient rotational frictional contact to hold the throttle hand control 10 setting at any throttle hand control 10 setting selected. This embodiment of the system of the invention is efficient because the springs 15,16 mounted on the bolts 13,14 with the self-locking nuts 17,18 are free to contract slightly or to increase in length slightly when surface irregularities are present either on the rubber throttle hand control 10 or on the brake lever hand control 6. If any surface irregularities are present on the rubber throttle hand control 10 or on the brake lever hand control 6 then the springs 15,16 are free to contract slightly or to increase in length slightly while maintaining efficient frictional contact.

Figure 3:
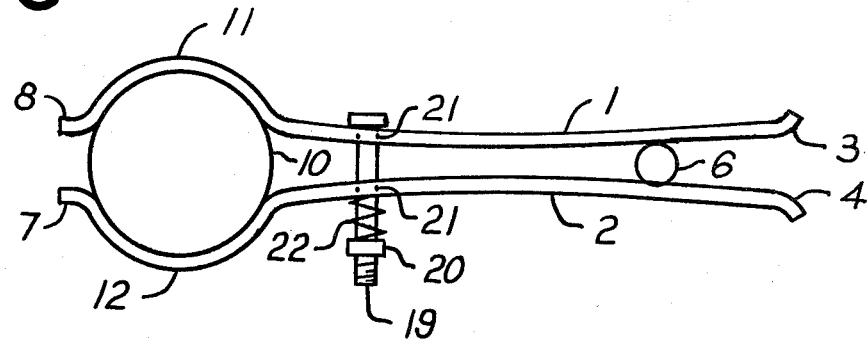
FIG. 3 is an axial elevation view showing the third embodiment of the invention.

Referring now to the drawings, in FIG. 3 there is shown an axial elevation view of the third embodiment of the invention. The "Motorcycle Throttle Gripper" includes a springy upper friction lever 1 and a springy lower friction lever 2. These friction levers 1,2 are made of a durable material such as steel for example. The slightly curved right half of the said friction levers 1,2 is shown. At a point approximately midway between the right hand extremities 3,4 and the left hand extremities 7,8 are shown holes 21,21 in the springy friction levers 1,2 which receive bolt 19 with a spring 22 and self-locking nut 20 which causes the brake lever hand control 6 to be in efficient frictional sliding contact with the springy upper friction lever 1 and the springy lower friction lever 2. Also, the bolt 19 with a spring 22 and self-locking nut 20 causes the rotational throttle hand control 10 to be in efficient frictional rotational contact with the springy upper friction lever 1 and the springy lower friction lever 2. When the throttle hand control 10 is rotated, it is in efficient rotational frictional contact with the offset concave portions 11,12 of the springy friction levers 1,2 to provide efficient rotational frictional contact to the throttle grip hand control 10. When the brake lever hand control 6 is actuated by hand then the slightly curved portion of the springy friction levers 1,2 are in efficient sliding frictional contact with the brake lever hand control 6. This embodiment of the invention also provides a "Motorcycle Throttle Gripper" which has very close to zero backlash. This means that even a very slight rotational movement of the throttle hand control 10 setting by the efficient offset concave portions 11,12 acting in rotational friction contact to hold the throttle hand control 10 setting at any throttle hand control 10 setting selected. This embodiment of the system of the invention is efficient because the spring 22 mounted on the bolt 19 with the self-locking nut 20 is free to contract slightly or to increase in length slightly when surface irregularities are present either on the rubber throttle hand control 10 or on the brake lever hand control 6. If any surface irregularities are present on the rubber throttle hand control 10 or on the brake lever hand control 6 then the spring 22 is free to contract slightly or to increase in length slightly while maintaining efficient contact.

It will thus be seen that the objects set forth above among those made apparent from the proceding description, are efficiently attained and, since certain changes may be made in the above construction and different embodiments of the invention could be made without departing from the scope thereof, it is intended that all matter contained in the above description or shown in the accompanying drawings shall be interpreted as illustrative and not in a limiting sense.

It is also to be understood that the following claims are intended to cover all of the generic and specific features of the invention herein described, and all statements of the scope of the invention which, as a matter of language, might be said to fall therebetween.

What is claimed is:

1. A motorcycle throttle gripper comprising: an upper friction lever and a lower friction lever with one said friction lever positioned above the throttle grip hand control and brake lever hand control and with one said friction lever positioned below the throttle grip hand control and brake lever hand control, and with an offset concave portion on each said friction lever to provide efficient rotational frictional contact with the throttle grip hand control, and with a straight portion on each said friction lever to provide efficient sliding friction contact with the brake lever hand control, and with the right hand extremities of the two said friction levers bent or hooked slightly to accept a flexing elastic member to keep the two said friction levers in efficient sliding contact with the brake lever hand control, and with the left hand extremities of the two said friction levers bent or hooked slightly to accept a flexing elastic member to keep the two said friction levers in efficient rotational frictional contact with the throttle grip hand control, with the two said efficient friction levers providing near zero backlash throttle gripping control.

2. A motorcycle throttle gripper wherein the improvement comprises: an upper friction lever and a lower friction lever with one said friction lever positioned above the throttle grip hand control and brake lever hand control and with one said friction lever positioned below the throttle grip hand control and brake lever hand control, and with an offset concave portion on each said friction lever to provide efficient rotational frictional contact with the throttle grip hand control, and with a straight portion on each said friction lever to provide efficient sliding friction contact with the brake lever hand control, and with the right hand extremities of the two said friction levers containing a hole to accept a bolt with a flexing spring and a self-locking nut to keep the straight portion of the two said friction levers in efficient sliding contact with the brake lever hand control, and with the left hand extremities of the two said friction levers containing a hole to accept a bolt with a flexing spring and a self-locking nut to keep the offset concave portion of the two said friction levers in efficient rotational contact with the throttle grip hand control, with the two said efficient friction levers providing near zero backlash throttle gripping control, wherein the improvement in this claim comprises the use of bolts, flexing springs, and self-locking nuts to provide fastening members of longer life than is associated with rubber bands or elastic bands which might break after ageing.

3. A motorcycle throttle grip speed setting gripper wherein the improvement comprises: a springy upper friction lever and a springy lower friction lever with one said springy friction lever positioned above the throttle grip hand control and brake lever hand control and with one said springy friction lever positioned below the throttle grip hand control and brake lever hand control, and with an offset concave portion on each said springy friction lever to provide efficient rotational frictional contact with the throttle grip hand control, and with a slightly curved portion on each said springy friction lever to provide efficient sliding frictional contact with the brake lever hand control and with the central portion of each of the two said springy friction levers containing a hole to accept a bolt with a flexing spring and a self-locking nut to keep the slightly curved portion of the two said springy friction levers in efficient sliding contact with the brake lever hand control, and the offset concave portions of the two said springy friction levers in efficient rotational frictional contact with the throttle grip hand control with the two said efficient springy friction levers providing near zero backlash throttle gripping control, wherein the improvement in this claim comprises the use of only one bolt, a flexing spring and self-locking nut to provide fastening members of longer life than is associated with rubber bands or elastic members which might break after ageing.

* * * * *